United States Patent
Chung et al.

(10) Patent No.: US 11,763,773 B2
(45) Date of Patent: Sep. 19, 2023

(54) COMPUTER DEVICE AND MULTI-COMPUTER SYSTEM

(71) Applicant: ASUSTeK COMPUTER INC., Taipei (TW)

(72) Inventors: Kai-Peng Chung, Taipei (TW); Chin-Chang Chang, Taipei (TW)

(73) Assignee: ASUSTeK COMPUTER INC., Taipei (TW)

( * ) Notice: Subject to any disclaimer, the term of this patent is extended or adjusted under 35 U.S.C. 154(b) by 0 days.

(21) Appl. No.: 17/832,715

(22) Filed: Jun. 6, 2022

(65) Prior Publication Data

US 2022/0398994 A1     Dec. 15, 2022

(30) Foreign Application Priority Data

Jun. 15, 2021   (TW) .................................. 110121651

(51) Int. Cl.
*G09G 5/00* (2006.01)
*G06F 3/14* (2006.01)
*G06F 13/10* (2006.01)
*G06F 13/40* (2006.01)

(52) U.S. Cl.
CPC ............. *G09G 5/006* (2013.01); *G06F 3/14* (2013.01); *G06F 13/102* (2013.01); *G06F 13/4081* (2013.01); *G09G 2370/22* (2013.01)

(58) Field of Classification Search
CPC ............. G09G 5/006; G09G 2370/22; G09G 2370/16; G06F 3/14; G06F 13/102; G06F 13/4081
See application file for complete search history.

(56) References Cited

U.S. PATENT DOCUMENTS

| 2012/0194411 | A1* | 8/2012 | Tajima | G09G 5/006 345/2.3 |
| 2018/0054557 | A1* | 2/2018 | Kim | H04N 23/64 |
| 2020/0213438 | A1* | 7/2020 | Liu | G06F 3/04886 |
| 2020/0313883 | A1* | 10/2020 | Huang | G06F 3/14 |

FOREIGN PATENT DOCUMENTS

| CN | 102457694 |   | 5/2012 |
| CN | 102457694 | A * | 5/2012 |
| CN | 205081872 |   | 3/2016 |
| CN | 103702056 |   | 1/2017 |
| CN | 106980559 |   | 8/2020 |

* cited by examiner

*Primary Examiner* — Brent D Castiaux
(74) *Attorney, Agent, or Firm* — JCIPRNET

(57) ABSTRACT

A computer device and a multi-computer system are provided. The computer device includes a central processing unit (CPU), a wireless connection circuit, and a switch circuit. The CPU is coupled to a display to provide an enabling display signal to the display according to a hot plug detection signal provided from the display. The wireless connection circuit receives one of a wireless connection signal and a wireless disconnection signal from a wireless input device. The switch circuit is coupled between the display and the CPU and coupled to the wireless connection circuit. The switch circuit provides the hot plug detection signal to the CPU when the wireless connection circuit receives the wireless connection signal, and masks the hot plug detection signal from the CPU when the wireless connection circuit receives the wireless disconnection signal.

14 Claims, 2 Drawing Sheets

COMPUTER DEVICE AND MULTI-COMPUTER SYSTEM

CROSS-REFERENCE TO RELATED APPLICATION

This application claims the priority benefit of Taiwan Application Serial No. 110121651, filed on Jun. 15, 2021. The entirety of the above-mentioned patent application is hereby incorporated by reference herein and made a part of specification.

BACKGROUND OF THE INVENTION

Field of the Invention

The disclosure relates to a computer device and a multi-computer system for which a display is shared.

Description of the Related Art

Nowadays, with the vigorous development of computer technologies, it is increasingly popular that an individual owns a plurality of computer hosts. For a user who often needs to perform operations between two computer hosts, the operations are performed by using a KVM switch. However, such a manner needs to be implemented by using additional external hardware. Alternatively, a user selects and switches between image sources through a user interface of the same display, to make a choice between different computer hosts. However, such a manner has a relatively complex operation, making it inconvenient to frequently switch between a plurality of computer hosts.

BRIEF SUMMARY OF THE INVENTION

According to the first aspect, a computer device is provided. The computer device includes a central processing unit (CPU), a wireless connection circuit, and a switch circuit. The CPU is coupled to a display to provide an enabling display signal to the display according to a hot plug detection signal provided from the display. The wireless connection circuit is configured to receive one of a wireless connection signal and a wireless disconnection signal from a wireless input device. The switch circuit is coupled between the display and the CPU and coupled to the wireless connection circuit. The switch circuit provides the hot plug detection signal to the CPU when the wireless connection circuit receives the wireless connection signal, and masks the hot plug detection signal from the CPU when the wireless connection circuit receives the wireless disconnection signal.

According to the second aspect, a multi-computer system is provided. The multi-computer system includes a display, a first computer device, a second computer device, and a wireless input device. The first computer device is coupled to the display, and the second computer device is also coupled to the display. The wireless input device is configured to be wirelessly connected to one of the first computer device and the second computer device. When the wireless input device is wirelessly connected to the first computer device, the wireless input device provides a wireless connection signal to the first computer device, and the first computer device provides an enabling display signal to the display according to a hot plug detection signal from the display and the wireless connection signal. The wireless input device provides a wireless disconnection signal to the second computer device, and the second computer device masks the hot plug detection signal from the display according to the wireless disconnection signal.

Based on the foregoing, in the disclosure, the computer device synchronizes the connection to or disconnection from the wireless input device with the connection to or disconnection from the display, to provide a more convenient switching operation.

To make the features and advantages of the disclosure more comprehensible, a detailed description is made below by using listed preferred embodiments with reference to the accompanying drawings.

DETAILED DESCRIPTION OF THE EMBODIMENTS

Figure 1:
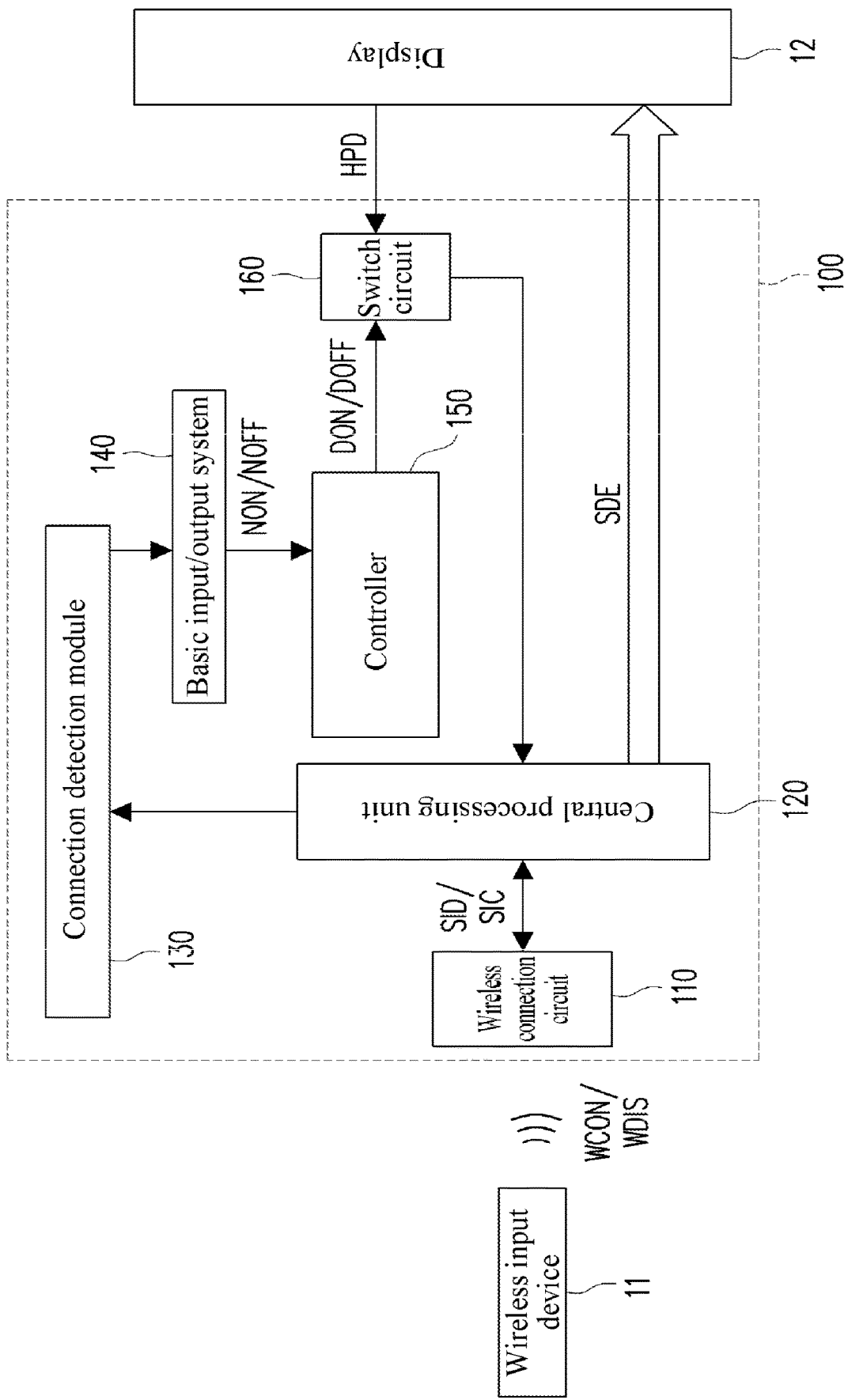
FIG. 1 is a schematic system diagram of a computer device according to an embodiment of the disclosure.

Referring to FIG. 1, in an embodiment, a computer device 100 includes a wireless connection circuit 110, a CPU 120, a connection detection module 130, a basic input/output system (I/O) 140, a controller 150, and a switch circuit 160. The connection detection module 130 and the basic I/O system 140 are software modules executed by the CPU 120.

The CPU 120 is coupled to the wireless connection circuit 110, the connection detection module 130, the switch circuit 160, and a display 12. The basic I/O system 140 is coupled to the connection detection module 130 and the controller 150. The switch circuit 160 is coupled to the controller 150 and the display 12. The coupling herein represents a functional connection or a physical connection, which is determined according to a circuit design.

The wireless connection circuit 110 is configured to receive one of a wireless connection signal WCON and a wireless disconnection signal WDIS from a wireless input device 11. In an embodiment, the wireless connection circuit 110 is wirelessly connected to the wireless input device 11 according to the received wireless connection signal WCON, and provides a connection indication signal SIC to the connection detection module 130 through the CPU 120. In addition, the wireless connection circuit 110 is disconnected from the wireless input device 11 according to the received wireless disconnection signal WDIS, and provides a disconnection indication signal SID to the connection detection module 130 through the CPU 120.

The connection detection module 130 controls, according to the connection indication signal SIC, the basic I/O system 140 to provide an on notification signal NON to the controller 150, and the connection detection module 130 controls, according to the connection indication signal SIC, the basic I/O system 140 to provide an off notification signal NOFF to the controller 150. The controller 150 provides a display on signal DON to the switch circuit 160 according to the on notification signal NON, and the controller 150 provides a display off signal DOFF to the switch circuit 160 according to the off notification signal NOFF. Therefore, the controller 150 provides the display on signal DON to the switch circuit 160 when the wireless connection circuit 110 receives the wireless connection signal WCON, and provides the display off signal DOFF to the switch circuit 160 when the wireless connection circuit 110 receives the wireless disconnection signal WDIS.

Next, the switch circuit 160 provides the hot plug detection signal HPD to the CPU 120 according to the display on signal DON. In this case, the CPU 120 provides an enabling display signal SDE to the display 12 when receiving the hot plug detection signal HPD provided from the display 12. In addition, the switch circuit 160 masks the hot plug detection signal HPD from the CPU 120 according to the display off signal DOFF. In this case, the CPU 120 does not provide the enabling display signal SDE according to the hot plug detection signal HPD. Therefore, the switch circuit 160 provides the hot plug detection signal HPD to the CPU 120 when the wireless connection circuit 110 receives the wireless connection signal WCON, and masks the hot plug detection signal HPD from the CPU 120 when the wireless connection circuit 110 receives the wireless disconnection signal WDIS.

In an embodiment, the hot plug detection signal HPD is a 3-volt signal. In addition, when the hot plug detection signal HPD is masked below 0.6 volt, the CPU 120 regards the hot plug detection signal HPD as masked.

Based on the foregoing, the CPU 120 provides the enabling display signal SDE when the wireless connection circuit 110 receives the wireless connection signal WCON, to synchronously connect the display 12 to a video output of the computer device 100, and the CPU 120 synchronously stops providing the enabling display signal SDE when the wireless connection circuit 110 receives the wireless disconnection signal WDIS, to disconnect the display 12 from the video output of the computer device 100. Therefore, the computer device synchronizes the connection to or disconnection from the wireless input device with the connection to or disconnection from the display, to provide a more convenient switching operation.

In an embodiment, the display 12 is connected to the computer device 100 through a high definition multimedia interface (HDMI). In addition, the wireless input device 11 includes a Bluetooth keyboard, and the wireless connection circuit 110 includes a Bluetooth module.

Figure 2:
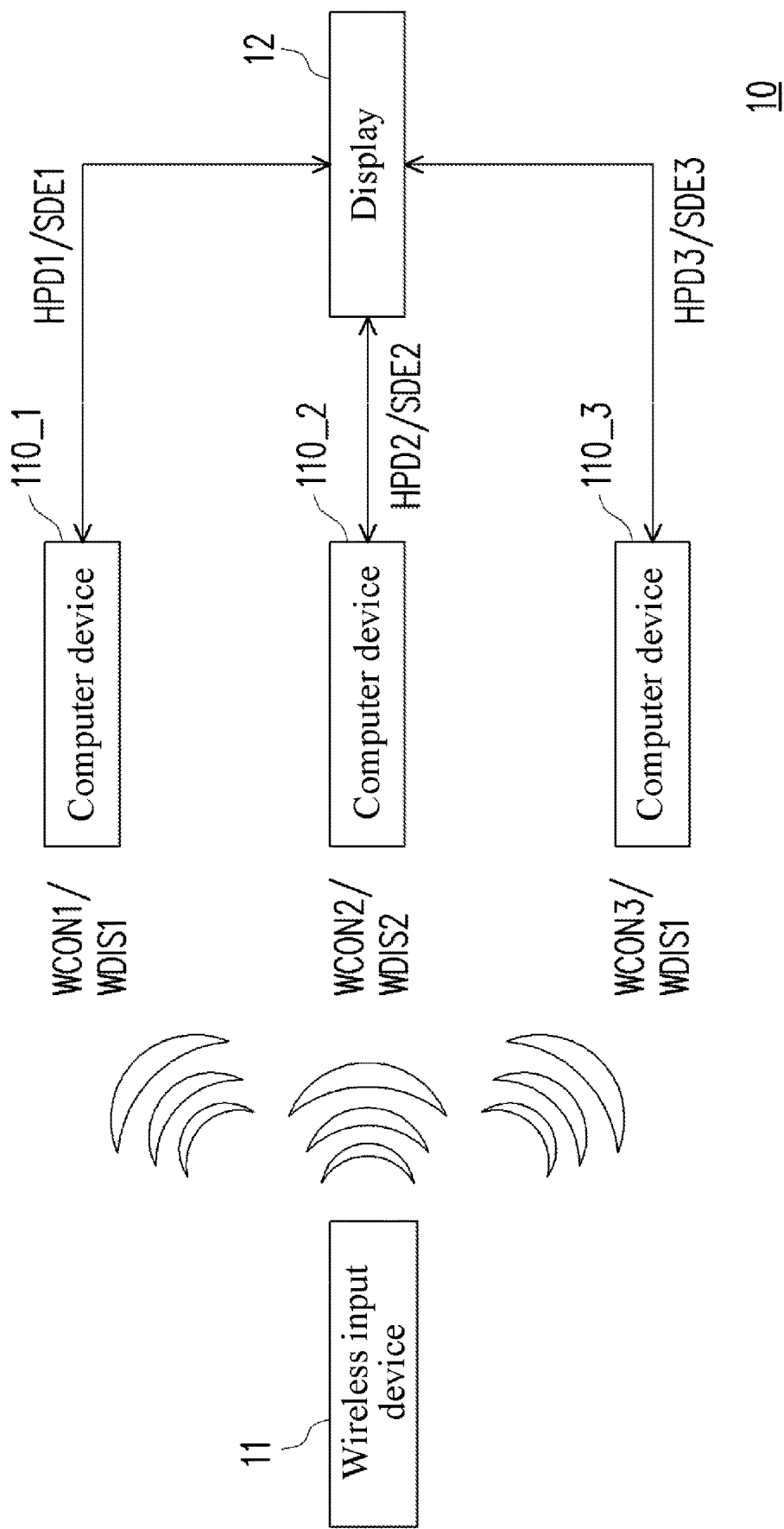
FIG. 2 is a schematic system diagram of a multi-computer system according to an embodiment of the disclosure.

Referring to FIG. 2, in an embodiment, a multi-computer system 10 includes a wireless input device 11, a first computer device 100_1, a second computer device 100_2, a third computer device 100_3, and a display 12. For the first computer device 100_1, the second computer device 100_2, and the third computer device 100_3, refer to the computer device 100 shown in FIG. 1. Same or similar reference numerals are used to indicate same or similar elements.

The wireless input device 11 is configured to be wirelessly connected to one of the first computer device 100_1, the second computer device 100_2, and the third computer device 100_3. The first computer device 100_1, the second computer device 100_2, and the third computer device 100_3 are coupled to the display 12. The display 12 is connected to the first computer device 100_1, the second computer device 100_2, and the third computer device 100_3 through an HDMI.

In an embodiment, the wireless input device 11 selects one of a first Bluetooth address associated with the first computer device 100_1, a second Bluetooth address associated with the second computer device 100_2, and a third Bluetooth address associated with the third computer device 100_3 according to a press on a switching button. The wireless input device 11 provides, when the first Bluetooth address is selected, a wireless connection signal WCON1 to the first computer device 100_1 to be wirelessly connected to the first computer device 100_1, and the wireless input device 11 provides, when the first Bluetooth address is not selected, a wireless disconnection signal WDIS1 to the first computer device 100_1 to be disconnected from the first computer device 100_1. The wireless input device 11 provides, when the second Bluetooth address is selected, a wireless connection signal WCON2 to the second computer device 100_2 to be wirelessly connected to the second computer device 100_2, and the wireless input device 11 provides, when the second Bluetooth address is not selected, a wireless disconnection signal WDIS2 to the second computer device 100_2 to be disconnected from the second computer device 100_2. The wireless input device 11 provides, when the third Bluetooth address is selected, a wireless connection signal WCON3 to the third computer device 100_3 to be wirelessly connected to the third computer device 100_3, and the wireless input device 11 provides, when the third Bluetooth address is not selected, a wireless disconnection signal WDIS3 to the third computer device 100_3 to be disconnected from the third computer device 100_3.

When the wireless input device 11 is wirelessly connected to the first computer device 100_1, the wireless input device 11 provides the wireless connection signal WCON1 to the first computer device 100_1, and the first computer device 100_1 provides an enabling display signal SDE1 to the display 12 according to a hot plug detection signal HPD1 from the display 12 and the wireless connection signal WCON1. In addition, when the wireless input device 11 provides the wireless disconnection signal WDIS2 to the second computer device 100_2 and provides the wireless disconnection signal WDIS3 to the third computer device 100_3, the second computer device 100_2 masks a hot plug detection signal HPD2 from the display 12 according to the wireless disconnection signal WDIS2, and the third computer device 100_3 masks a hot plug detection signal HPD3 from the display 12 according to the wireless disconnection signal WDIS3.

When the wireless input device 11 is wirelessly connected to the second computer device 100_2, the wireless input device 11 provides the wireless connection signal WCON2 to the second computer device 100_2, and the first computer device 100_2 provides an enabling display signal SDE2 to the display 12 according to the hot plug detection signal HPD2 from the display 12 and the wireless connection signal WCON2. In addition, when the wireless input device 11 provides the wireless disconnection signal WDIS1 to the first computer device 100_1 and provides the wireless disconnection signal WDIS3 to the third computer device 100_3, the first computer device 100_1 masks the hot plug detection signal HPD1 from the display 12 according to the wireless disconnection signal WDIS1, and the third computer device 100_3 masks the hot plug detection signal HPD3 from the display 12 according to the wireless disconnection signal WDIS3.

When the wireless input device 11 is wirelessly connected to the third computer device 100_3, the wireless input device 11 provides the wireless connection signal WCON3 to the third computer device 100_3, and the third computer device 100_3 provides an enabling display signal SDE3 to the display 12 according to the hot plug detection signal HPD3 from the display 12 and the wireless connection signal WCON3. In addition, when the wireless input device 11 provides the wireless disconnection signal WDIS1 to the first computer device 100_1 and provides the wireless disconnection signal WDIS2 to the second computer device 100_2, the first computer device 100_1 masks the hot plug detection signal HPD1 from the display 12 according to the wireless disconnection signal WDIS1, and the second computer device 100_2 masks the hot plug detection signal HPD2 from the display 12 according to the wireless disconnection signal WDIS2.

In summary, according to the computer device and the multi-computer system in the embodiments of the disclosure, the computer device synchronizes the connection to or disconnection from the wireless input device with the connection to or disconnection from the display, to provide a more convenient switching operation.

Although the disclosure has been described with reference to the foregoing embodiments, the embodiments are not intended to limit the disclosure. A person of ordinary skill in the art may make variations and improvements without departing from the spirit and scope of the disclosure. Therefore, the protection scope of the disclosure should be subject to the appended claims.

What is claimed is:

1. A computer device, comprising:
   a central processing unit (CPU), coupled to a display to provide an enabling display signal to the display according to a hot plug detection signal provided from the display;
   a wireless connection circuit, configured to receive one of a wireless connection signal and a wireless disconnection signal from a wireless input device; and
   a switch circuit, coupled between the display and the CPU and coupled to the wireless connection circuit, wherein the switch circuit provides the hot plug detection signal to the CPU when the wireless connection circuit receives the wireless connection signal, and masks the hot plug detection signal from the CPU when the wireless connection circuit receives the wireless disconnection signal.

2. The computer device according to claim 1, further comprising:
   a controller, coupled to the wireless connection circuit and the switch circuit, wherein the controller provides a display on signal to the switch circuit when the wireless connection circuit receives the wireless connection signal, and provides a display off signal to the switch circuit when the wireless connection circuit receives the wireless disconnection signal,
   wherein the switch circuit provides the hot plug detection signal to the CPU according to the display on signal, and masks the hot plug detection signal from the CPU according to the display off signal.

3. The computer device according to claim 2, further comprising:
   a connection detection module, coupled to the wireless connection circuit and the controller; and
   a basic input/output system (I/O system), coupled to the connection detection module and the controller, wherein
   the wireless connection circuit provides a connection indication signal to the connection detection module according to the received wireless connection signal, the connection detection module controls, according to the connection indication signal, the basic I/O system to provide an on notification signal to the controller, and the controller provides the display on signal to the switch circuit according to the on notification signal, and
   the wireless connection circuit provides a disconnection indication signal to the connection detection module according to the received wireless disconnection signal, the connection detection module controls, according to the connection indication signal, the basic I/O system to provide an off notification signal to the controller, and the controller provides the display off signal to the switch circuit according to the off notification signal.

4. The computer device according to claim 3, wherein the connection detection module is a software module executed by the CPU.

5. The computer device according to claim 1, wherein the display is connected to the computer device through a high definition multimedia interface (HDMI).

6. The computer device according to claim 1, wherein the wireless connection circuit comprises a module using bluetooth protocol.

7. A multi-computer system, comprising:
   a display;
   a first computer device, coupled to the display;
   a second computer device, coupled to the display; and
   a wireless input device, configured to be wirelessly connected to one of the first computer device and the second computer device, wherein
   when the wireless input device is wirelessly connected to the first computer device, the wireless input device provides a wireless connection signal to the first computer device, and the first computer device provides an enabling display signal to the display according to a hot plug detection signal from the display and the wireless connection signal, and
   the wireless input device provides a wireless disconnection signal to the second computer device, and the second computer device masks the hot plug detection signal from the display according to the wireless disconnection signal.

8. The multi-computer system according to claim 7, wherein each of the first computer device and the second computer device comprises:
   a central processing unit (CPU), coupled to the display to provide the enabling display signal to the display according to the received hot plug detection signal provided from the display;
   a wireless connection circuit, configured to receive a corresponding one of the wireless connection signal and the wireless disconnection signal from the wireless input device; and
   a switch circuit, coupled between the display and the CPU and coupled to the wireless connection circuit, wherein the switch circuit provides the hot plug detection signal to the CPU when the wireless connection circuit receives the wireless connection signal, and masks the hot plug detection signal from the CPU when the wireless connection circuit receives the wireless disconnection signal.

9. The multi-computer system according to claim 8, further comprising:
   a controller, coupled to the wireless connection circuit and the switch circuit, wherein the controller provides a display on signal to the switch circuit when the wireless connection circuit receives the wireless connection signal, and provides a display off signal to the switch circuit when the wireless connection circuit receives the wireless disconnection signal, wherein
   the switch circuit provides the hot plug detection signal to the CPU according to the display on signal, and masks the hot plug detection signal from the CPU according to the display off signal.

10. The multi-computer system according to claim 9, further comprising:
    a connection detection module, coupled to the wireless connection circuit and the controller; and a basic input/output (I/O) system, coupled to the connection detection module and the controller, wherein the wireless connection circuit provides a connection indication signal to the connection detection module according to the received wireless connection signal, the connection detection module controls, according to the connection indication signal, the basic I/O system to provide an on notification signal to the controller, and the controller provides the display on signal to the switch circuit according to the on notification signal, and the wireless connection circuit provides a disconnection indication signal to the connection detection module according to the received wireless disconnection signal, the connection detection module controls, according to the connection indication signal, the basic I/O system to provide an off notification signal to the controller, and the controller provides the display off signal to the switch circuit according to the off notification signal.

11. The multi-computer system according to claim 10, wherein the connection detection module is a software module executed by the CPU.

12. The multi-computer system according to claim 7, wherein the display is connected to the first computer device and the second computer device through a high definition multimedia interface (HDMI).

13. The multi-computer system according to claim 7, wherein the wireless input device comprises a keyboard using bluetooth protocol.

14. The multi-computer system according to claim 13, wherein the wireless input device selects one of a first address associated with the first computer device and a second address associated with the second computer device according to a press on a switching button, the wireless input device provides, when the first address is selected, the wireless connection signal to the first computer device to be wirelessly connected to the first computer device, and the wireless input device provides, when the second address is not selected, the wireless disconnection signal to the second computer device to be disconnected from the second computer device.

* * * * *